Feb. 2, 1960  J. L. WILCOX  2,923,537
AUGER MINING SECTION ASSEMBLY
Filed April 7, 1958  8 Sheets-Sheet 1

Fig. 1.

INVENTOR
John L. Wilcox
BY Cushman, Darby & Cushman
ATTORNEYS

INVENTOR
John L. Wilcox

INVENTOR
John L. Wilcox

Feb. 2, 1960  J. L. WILCOX  2,923,537
AUGER MINING SECTION ASSEMBLY
Filed April 7, 1958  8 Sheets—Sheet 5

INVENTOR
John L. Wilcox
BY Cushman, Darby & Cushman
ATTORNEYS

Feb. 2, 1960 J. L. WILCOX 2,923,537
AUGER MINING SECTION ASSEMBLY
Filed April 7, 1958 8 Sheets-Sheet 7

INVENTOR
John L. Wilcox

BY Cushman, Darby & Cushman
ATTORNEYS

Feb. 2, 1960 J. L. WILCOX 2,923,537
AUGER MINING SECTION ASSEMBLY
Filed April 7, 1958 8 Sheets-Sheet 8

INVENTOR
John L. Wilcox

BY
Cushman, Darby & Cushman
ATTORNEYS

United States Patent Office 2,923,537
Patented Feb. 2, 1960

2,923,537

AUGER MINING SECTION ASSEMBLY

John L. Wilcox, Nimitz, W. Va., assignor to Wilcox Manufacturing Company, Raleigh, W. Va., a corporation of West Virginia Application April 7, 1958, Serial No. 726,955

20 Claims. (Cl. 262—9)

This invention relates to mineral recovery and more particularly to apparatus for removing material from a mine vein.

In certain types of mine veins, the most advantageous method of removing material therefrom, is by advancing an elongated auger longitudinally into the vein at horizontally spaced positions. The auger, which may attain a length of between 100 to 200 feet, serves to cut the material from the vein and convey it to a point of discharge. Apparatus for effecting the advance of such augers into the vein are well-known. In general, they include a frame having a carriage mounted thereon for horizontal reciprocating movement. The auger which serves to remove the material from the mine vein is usually made up of a series of auger sections detachably connected in end to end relation. In the normal operation of the apparatus, a first section is connected with a source of rotative power on the carriage and the latter is advanced toward the mine vein to advance the auger section therein. After the section has been fully advanced into the mine vein, the carriage is disconnected therefrom and moved back into a retracted position on the frame. Next, another section is connected in longitudinal alignment between the first section and the carriage and, upon advancing the carriage, both of the auger sections are then advanced into the mine vein. This procedure is repeated utilizing additional auger sections until material in a cylindrical portion of the vein a distance of between 100 to 200 feet has been removed. The auger sections are then disassembled by reversing the procedure noted above. The apparatus described above and the associated mining procedure has the advantage of eliminating the necessity of providing corridors and the like in the vein which must be supported by timbers, mine roof bolts or other expensive and time consuming equipment.

Of necessity, an auger of the type described above removes a portion of the material from the mine vein which is cylindrical. That is, the hole left after the cutting means has operated in the vein will be of circular cross-section. Collapse of the vein is prevented by spacing these holes horizontally in the vein so that the material between adjacent holes form colums which support the earth above the vein. It will be understood that the strength of these columns is limited by the narrowest thickness of the same between adjacent holes which will be at the central portion thereof. Thus, the additional thickness of the columns above and below the central portion serve no useful function and reduce the recovery from the vein.

The present invention contemplates an auger section assembly for use in combination with an apparatus of the type described above which is operable to increase the yield by recovering the material from the vein which define the above mentioned additional thickness of the columns. In general, the present invention contemplates an auger section assembly having auxiliary cutting means operable to square the normally circular hole cut in the mine vein. In this way a maximum recovery is obtained and the material between adjacent holes has a minimum thickness throughout which is sufficient to prevent collapse of the vein.

Accordingly, it is an object of the present invention to provide an auger mining section assembly of the type described having improved auxiliary cutting means operable to cut at least one-half of the material remaining in a rectangular prism which has its axis coincident with the axis of the normally cut cylindrical portion of the mine vein and dimensions substantially equal to the diameter thereof.

Another object of the present invention is the provision of an auger mining section assembly of the type described having improved auxiliary toothed chain cutting means thereon operable to square the normally round hole cut by a conventional auger section.

Still another object of the present invention is the provision of an auger mining section assembly of the type described having improved auxiliary auger cutting means for squaring the normally round hole cut by a conventional auger section.

Still another object of the present invention is the provision of an auger mining section assembly of the type described having improved auxiliary rotary blade cutting means for squaring the normally round hole cut by a conventional auger section.

These and other objects of the present invention will become more apparent during the course of the following detailed description and appended claims.

The invention may best be understood with reference to the accompanying drawings wherein illustrative embodiments are shown.

Figure 1:
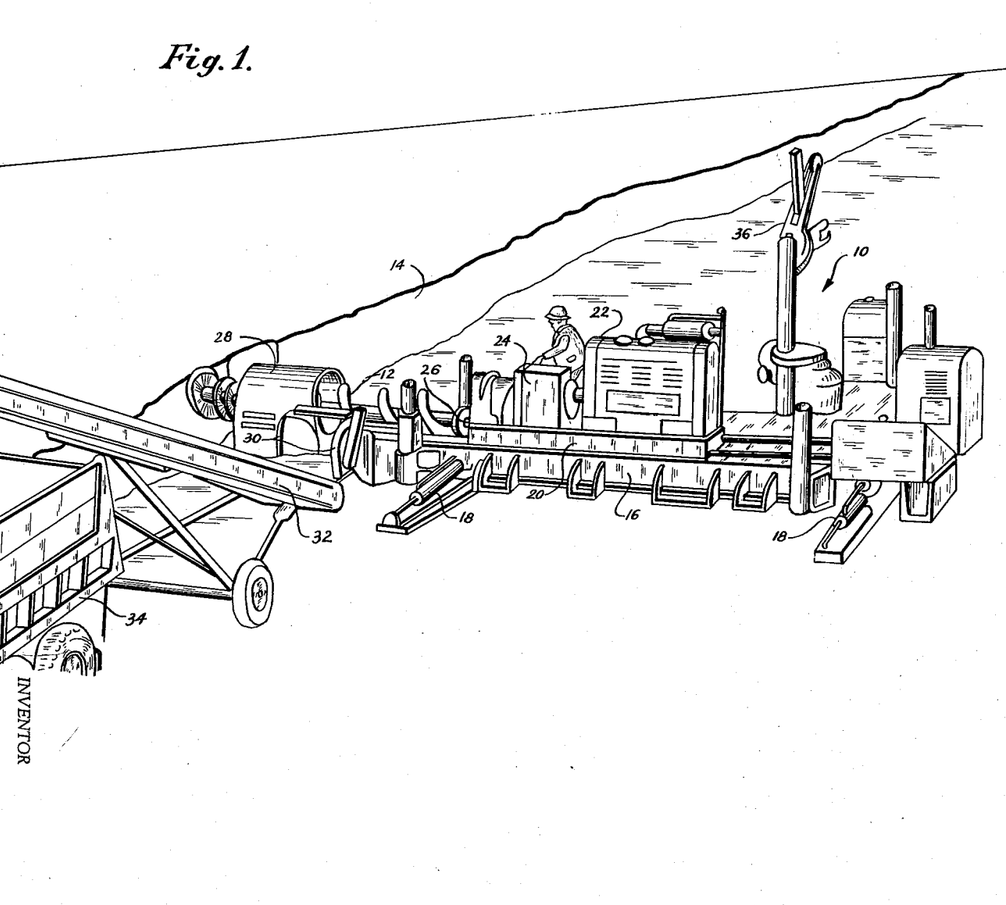
Figure 1 is a perspective view of a mining apparatus of known design showing the same in operation within a mine vein.

Referring now more particularly to Figure 1, there is shown a mining apparatus, generally indicated at 10, which is of conventional design. The apparatus is of the type which is operable to advance successive inter-connected auger mining sections, such as sections 12 shown in Figure 1, into a mine vein, shown at 14. In general, the apparatus 10 includes a frame 16 supported on the mine floor adjacent the vein 14. Any suitable means is provided on the frame for moving the same along the mine floor in parallel relationship to the vein 14 and, as shown, such means embodies a plurality of hydraulic ram operated legs 18 or the like.

Mounted on the frame 16 for horizontal reciprocating movement toward and away from the vein 14 between extended and retracted positions is a carriage 20. A source of rotative power, such as an internal combustion engine 22 or the like, is preferably mounted on the carriage 20 for rotating the input shaft of a gear reduction box 24, the output shaft of which is provided with a connection 26 for detachably engaging the rear end of successive auger mining sections 12. The carriage 20 is moved between its extended and retracted positions by any suitable means (not shown).

During the movement of the carriage from its retracted position toward the mine vein 14 to its extended position, the auger mining sections 12 attached to the connection 26 are advanced longitudinally into the mine vein and simultaneously rotated. This advance of the auger mining sections into the vein serves to remove the material from a cylindrical portion thereof engaged by the sections and to convey the material thus removed rearwardly into a housing 28 from which it is directed, as by plates 30 or the like, onto a portable conveyor 32 arranged to discharge the removed material into a truck 34. When the carriage reaches its fully extended position, the connection 26 is detached from the rearward auger section and then the carriage is returned to its retracted position to receive the next successive section. Each successive section is moved into an attaching position, in longitudinal alignment with the proceeding section and connection 26, by a boom assembly 36 carried by the frame 16. In this way, the apparatus is operable to advance successive auger mining sections connected together in longitudinal alignment into the mine vein 14 a distance of between 100 and 200 feet, each section normally being approximately six feet in length. After a cylindrical portion of the material from the mine vein 14 has been removed of a sufficient length, the above procedure is reversed to remove the auger mining sections from the mine vein and separate the sections. When this has been accomplished, the apparatus is moved along the mine floor by actuation of the hydraulic rams 18 to a horizontally spaced position of operation and the above procedure is repeated.

As noted above, the apparatus 10 may be of any conventional design and forms no part of the present invention except insofar as it is combined with the structure hereinafter described to form an operative whole. The present invention is more particularly concerned with an auger mining section assembly for use with an apparatus, such as illustrated at 10, to increase the yield of material cut from the mine vein without increasing the danger of the vein collapsing.

Referring now more particularly to Figures 2 through 8, there is shown one form of an auger mining section assembly, generally indicated at 40, which embodies the principles of the present invention. The assembly 40 includes a forward auger part 42 which is preferably constructed of a pair of spiral or helical blades 44 disposed 180° out of phase with respect to each other and rigidly secured to a longitudinally extending hollow hub member 46. Secured to the forward end of the blades 44 is a forward cutter bar 48 having a series of teeth 50 extending forwardly therefrom. The rear end of the hub member 46 is formed with its opening of square cross-sectional configuration which defines a shaft receiving socket 52.

Figure 2:
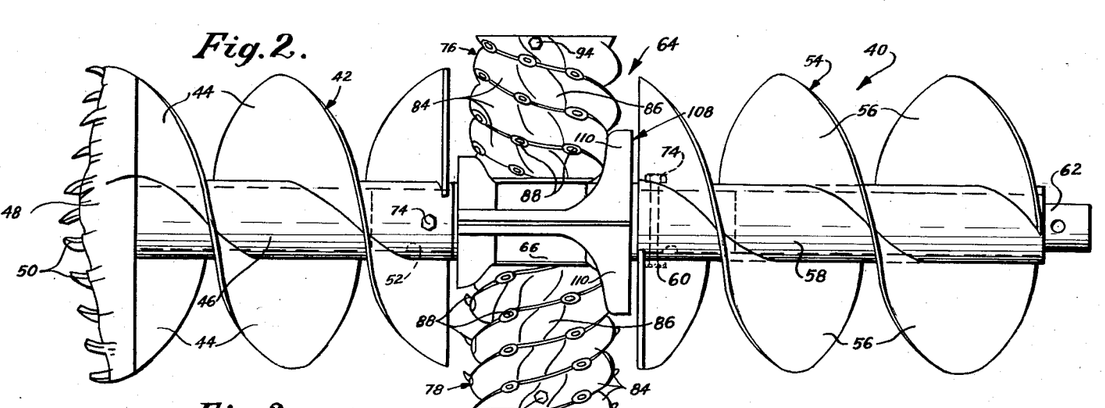
Figure 2 is a top plan view of an auger mining section assembly embodying the principles of the present invention.
Figure 3:
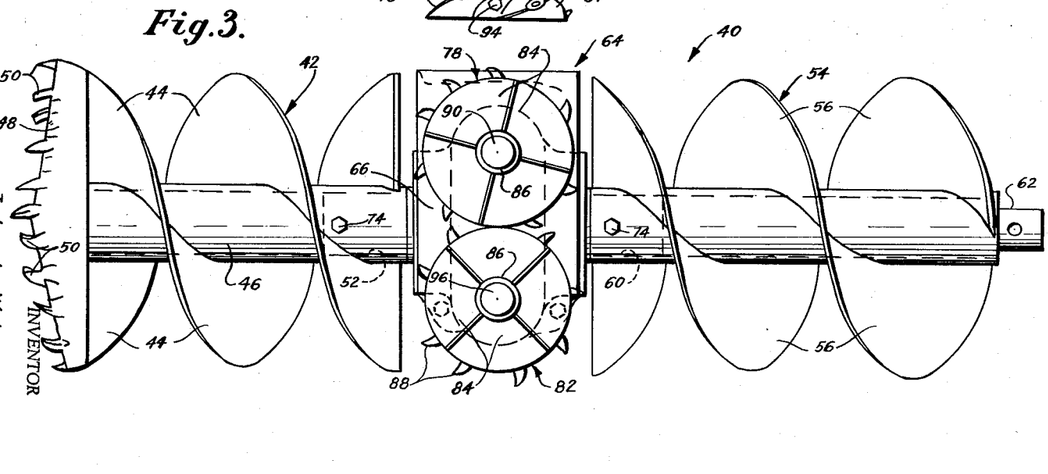
Figure 3 is a side elevational view of the assembly shown in Figure 2.

The assembly 40 also includes a rearward auger part 54 which preferably is constructed of a pair of spiral or helically formed blades 56 arranged 180° out of phase with each other in a manner similar to the blades 44 of the forward auger part 42. As before, the inner edges of the blades 56 are rigidly connected with a hollow hub member 58, the forward end of which is provided with a square socket 60 and the rearward end of which has a square shaft 62 extending outwardly therefrom.

Figure 6:
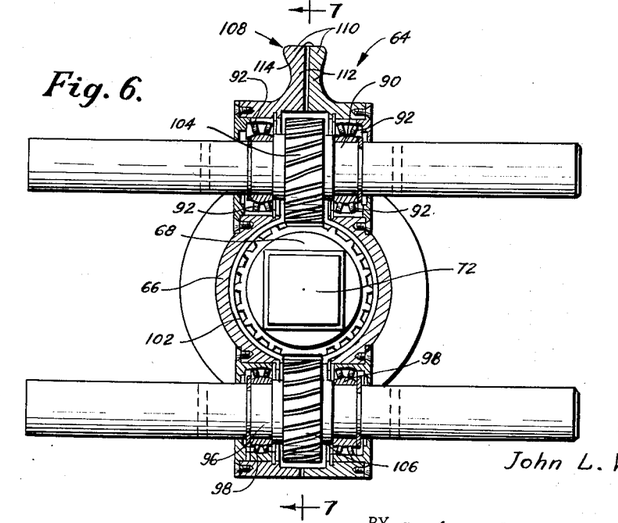
Figure 6 is a cross-sectional view taken along line 6—6 of Figure 5.

The assembly 40 also includes an auxiliary cutting unit, generally indicated at 64, which is operatively connected between the forward and rearward auger parts 42 and 54. The unit 64 includes a housing 66 which may be of suitable two-piece bolted construction, within which a longitudinally extending shaft 68 is journaled, as by roller bearings 70 or the like. The forward and rearward ends of the shaft 68 are formed with a square cross-sectional configuration, as indicated at 72, for engagement within the sockets 52 and 60 of the forward and rearward auger parts 42 and 54 respectively. Any suitable means may be provided for rigidly securing the shaft ends 72 within the associated auger part sockets, such as bolts 74 or the like extending through appropriate apertures in the shaft ends and registering apertures formed in the hub member of the associated auger part.

Figure 4:
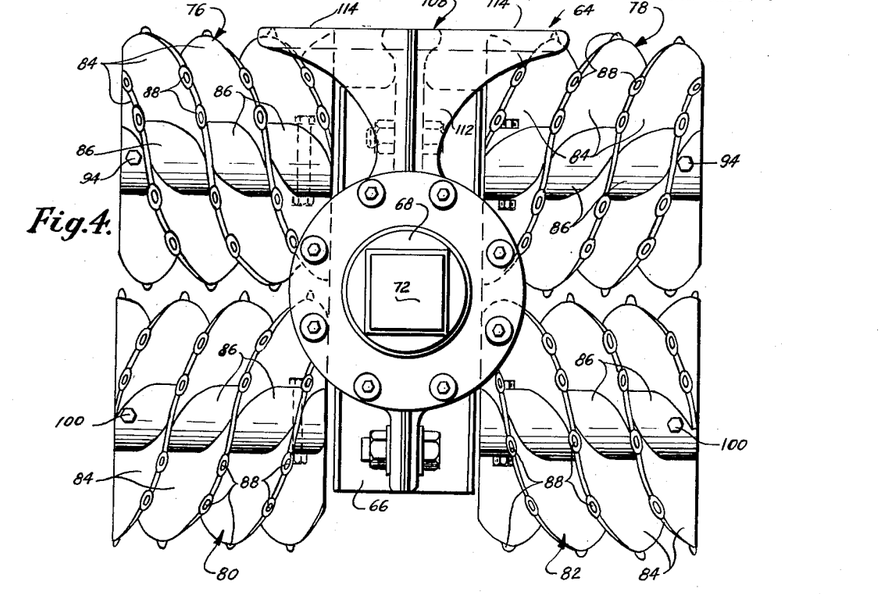
Figure 4 is a rear elevational view of the auxiliary cutting unit of the assembly.
Figure 5:
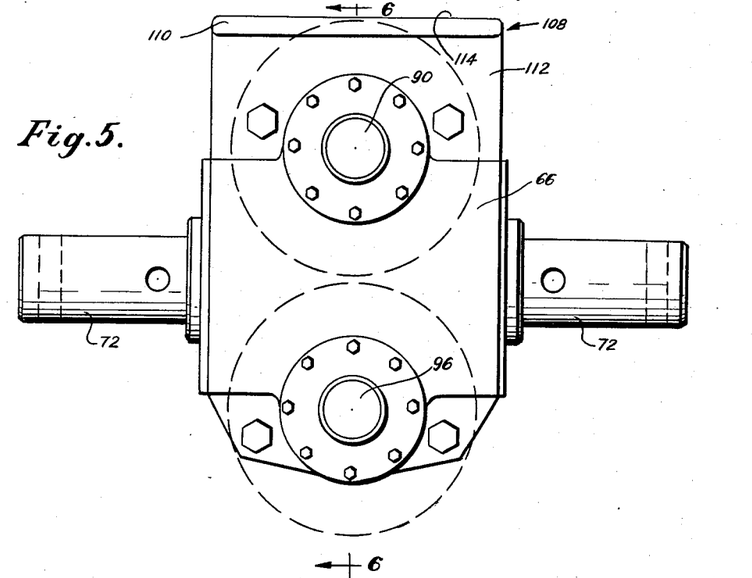
Figure 5 is a side elevational view of the unit shown in Figure 4 illustrating the auger cutter in broken lines.

The auxiliary cutting unit 64 includes an upper pair of oppositely pitched auger cutters 76 and 78 mounted on the opposite sides of the housing for rotation about a common transverse horizontal axis spaced above the axis of rotation of the shaft 68 and a lower pair of auger cutters 80 and 82 mounted in the housing for rotation about a transverse horizontal axis spaced below the axis of rotation of the shaft 68 a distance substantially equal to the spacing between the common axes of the auger cutters 76 and 78 and the axis of the shaft 68. Each of the auger cutters 76, 78, 80 and 82 is of similar construction and includes four helical or spiral blades 84 disposed 90° out of phase with respect to each other and having their inner surfaces rigidly secured to a longitudinally extending hollow hub member 86. Preferably, the other edges of each of the helical blades 84 is provided with a series of spaced teeth 88.

As best shown in Figures 4 and 6, the upper pair of auger cutters 76 and 78 are rotatably mounted on the housing 66 by means of an upper shaft 90 journaled in the upper portion of the housing, as by roller bearings 92 or the like and having opposite ends extending outwardly of the housing for engagement within the hollow hub members 86 of the auger cutters 76 and 78 respectively. The hub member of each cutter is secured to the associated shaft end by any suitable means, such as bolts 94 and the like.

The lower pair of auger cutters 80 and 82 are mounted on the housing by means of a shaft 96 suitably journaled in the housing, as by roller bearings 98 or the like and having opposite ends extending outwardly from the housing for engagement within the hollow hub members 86 of the respective auger cutters 80 and 82. As before, the hub members of the cutters are secured to the associated shaft ends by any suitable means, such as bolts 100 or the like.

Figure 7:
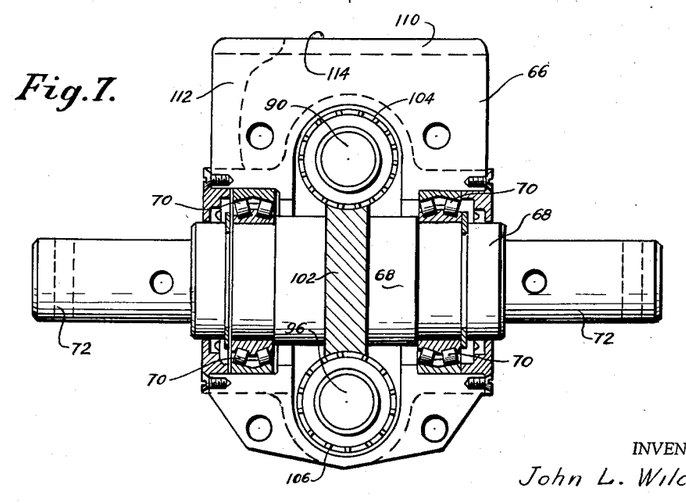
Figure 7 is a cross-sectional view taken along line 7—7 of Figure 6.

As best shown in Figures 6 and 7, the shafts 90 and 96 are drivingly connected with the main shaft 68 by any suitable means, such as a first gear 102 suitably fixed to the central portion of the main shaft 68 and secondary gears 104 and 106 fixed to the shafts 90 and 96 respectively in meshing engagement with the gear 102.

The auxiliary cutting unit is stabilized against rotary movement with the forward and rearward auger parts 42 and 54 by a suitable stabilizing means, generally indicated at 108. The stabilizing means preferably is in the form of a pair of longitudinally extending stabilizing shoes 110 which are rigidly secured to the housing by suitable webs 112 or the like rigid with the shoes and the housing. It will be noted that the shoes are disposed above the housing and have upper surfaces 114 in horizontal alignment with the upper periphery of the upper pair of auger cutters 76 and 78 so as to engage the upper wall defining the hole cut by the auger cutters and thus prevent turning movement of the auxiliary cutting unit with the auger parts 42 and 54.

Figures 8, 9, 13, 19:
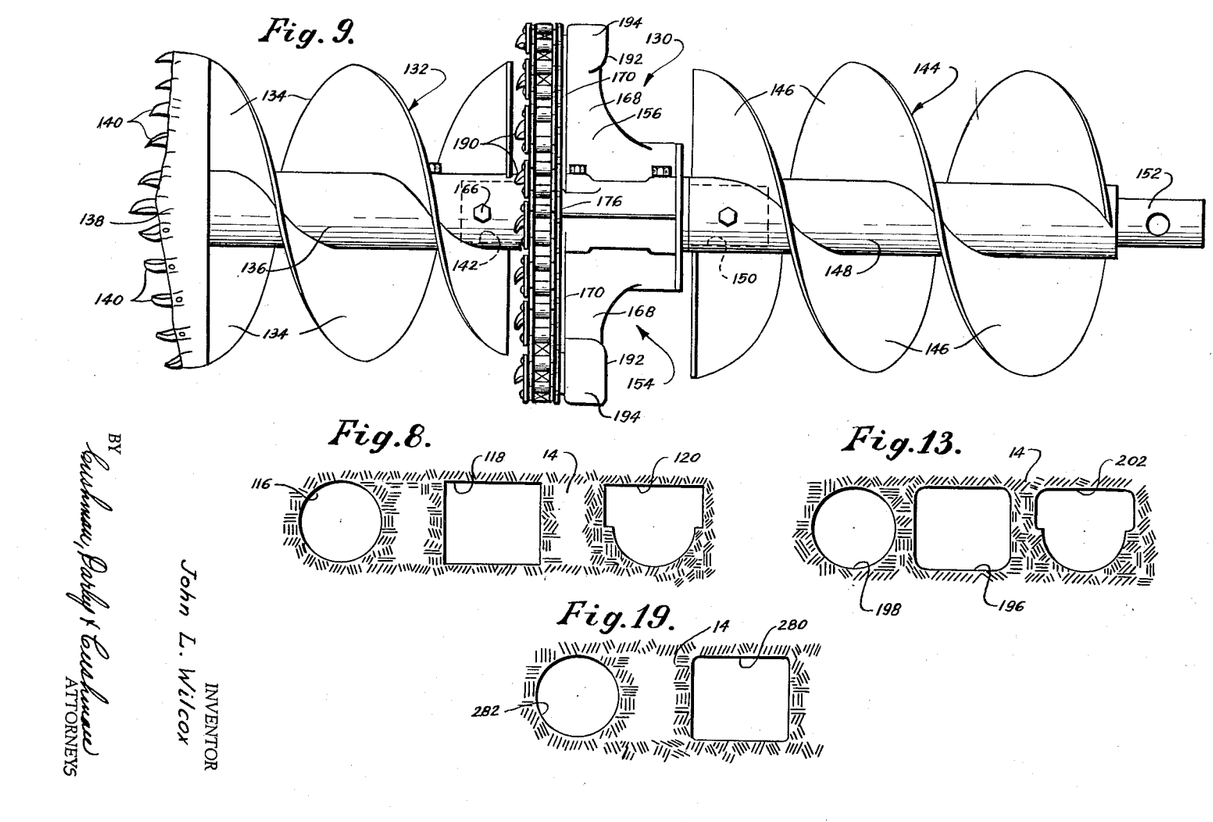
Figure 8 is a cross-sectional view through a mine vein illustrating the shape of cuts made by a conventional auger section and the auger section assembly illustrated in Figures 2–7.
Figure 9 is a top plan view of another form of an auger mining section assembly embodying the principles of the present invention.
Figure 13 is a view similar to Figure 8 illustrating the shape of cuts made by a conventional auger section and the assembly shown in Figures 9–12.
Figure 19 is a view similar to Figures 8 and 13 illustrating the shape of cuts made by a conventional auger section and the assembly illustrated in Figures 14–18.

Referring now to Figure 8, there is shown a cross-sectional view through a mine vein 14 illustrating, at 116, a cut of circular cross-section of the type which would be formed by a conventional auger mining section or by the auger parts 42 and 54. The auxiliary cutting unit 64 is operable to square the hole normally cut by a conventional auger mining section so that it will appear as illustrated at 118 in Figure 8. If desired, the lower pair of auger cutters 80 and 82 can be eliminated so that the resulting cross-sectional configuration of the hole formed by the auxiliary cutting unit 64 in conjunction with the auger parts would be as indicated at 120 in Figure 8.

In Figures 9 through 12 there is illustrated another form of an auger mining section assembly, generally indicated at 130, embodying the principles of the present invention. The assembly 130 includes a forward auger part 132 which preferably is constructed of a pair of spiral or helical blades 134 disposed 180° out of phase with respect to each other and having their inner edges rigidly secured to a hollow hub member 136. The forward edges of the helical blades 134 have a cutting bar 138 rigidly secured thereto, the forward edge of the bar 138 being apertured to receive a plurality of cutting teeth 140. The rearward end of the hollow hub member 136 is provided with a square interior cross-sectional configuration which provides a shaft receiving socket 142.

The assembly 130 also includes a rearward auger part 144 which preferably is constructed of a pair of helical or spiral blades 146 disposed 180° out of phase with each other and having their inner edges rigidly secured to a hollow hub member 148. The forward end of the hollow hub member 148 is provided with a square interior cross-sectional configuration which forms shaft receiving socket 150. Extending outwardly from the rearward end of the hollow hub member 148 is a stub shaft 152 of square cross-sectional configuration for engagement within the forward end of an auger mining section of conventional configuration.

Figure 10:
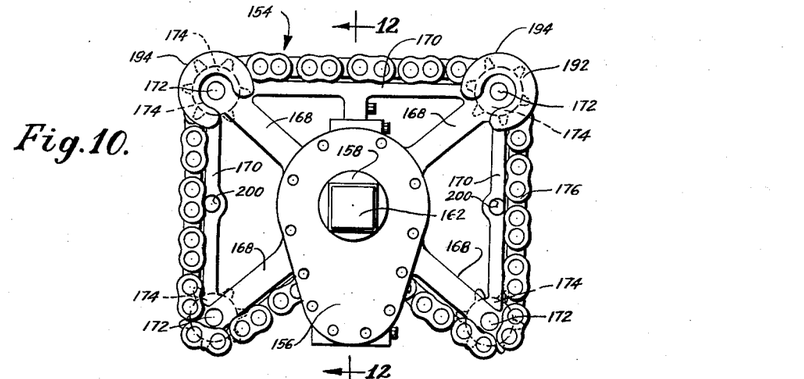
Figure 10 is a rear elevational view of the auxiliary cutting unit of the assembly shown in Figure 9.
Figure 11:
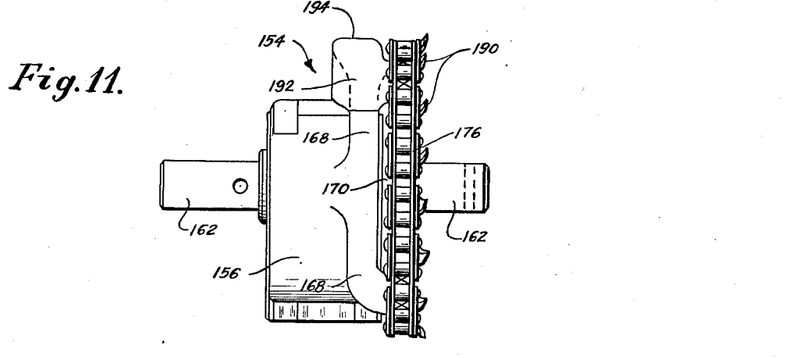
Figure 11 is a side elevational view of the unit shown in Figure 10.

The assembly 130 also includes an auxiliarly cutting unit, generally indicated at 154, which is operatively connected between the forward and rearward auger parts 132 and 144. The unit 154 includes a housing 156 which is preferably of a suitable two-piece construction having a main shaft 158 journaled therein by any suitable means such as roller bearings 160. The ends of the shaft 158 extend outwardly from opposite ends of the housing and are formed with a square cross-sectional configuration as indicated at 162 for engagement within the sockets 142 and 150 respectively of the forward and rearward auger parts. The shaft ends 162 are secured within the sockets 142 and 150 by any suitable means, such as bolts 166 extending through suitable apertures through the shaft ends and registering apertures in the hub members of the associated auger parts.

Extending radially outwardly from the housing 156 are four rigid arms 168, the outer ends of which are rigidly interconnected by three connecting bars 170. The outer end of each arm is apertured to receive a shaft 172 and a sprocket wheel 174 is secured to each shaft 172. As best shown in Figure 10, it will be noted that sprocket wheels are positioned relative to each other so that there is an upper pair spaced apart horizontally on opposite sides of the axis of the shaft 158 having their axes disposed in a common horizontal plane spaced vertically from the axis of the shaft 158 and a similar pair of lower sprocket wheels having their axes disposed in a horizontal plane spaced below the axis of the shaft 158 a distance substantially equal to the distance between the axis of the shaft 158 and the plane passing through the axes of the upper pair of sprocket wheels.

Figure 12:
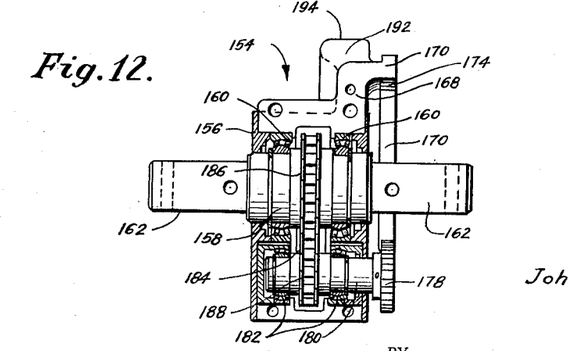
Figure 12 is a cross-sectional view taken along line 12—12 of Figure 10.

An endless chain 176 of any suitable construction is trained about the four sprocket wheels 174 and is driven by a shaft sprocket wheel 178 fixed to a shaft 180 journaled in the housing below the shaft 158, by any suitable means, such as roller bearings 182. As best shown in Figure 12, the shaft 180 is driven from the main shaft 158, by any suitable means, such as a sprocket chain 184 trained about a first sprocket wheel 186 fixed to the main shaft 158 and a second sprocket wheel 188 fixed to shaft 180.

The forward surface of the chain 176 has rigidly secured thereto a plurality of forwardly extending cutting teeth 190. It will be noted that the teeth 190 travel with the chain in a substantially rectangular path around the four sprocket wheels 174.

In order to prevent rotary movement of the auxiliary cutting unit 154 with the auger parts 132 and 144 there is provided a stabilizing means in the form of a pair of longitudinally extending stabilizing shoes 192. As best shown in Figure 10, the stabilizing shoes 192 are disposed in longitudinal alignment with the upper pair of sprocket wheels 174 rearwardly of the chain 176 and each includes an outer surface 194 arranged to engage the wall of the hole formed by the movement of the cutting teeth 190 in conjunction with the movement of the auger part 132.

As best shown in Figure 13, the auxiliary cutting unit 154 will form a cut in the mine vein 14 having a cross-sectional configuration which is substantially square, as indicated at 196. A conventional auger mining section would make a corresponding circular cross-sectional hole as indicated at 198. If desired, the lower pair of sprocket wheels 174 may be disposed within the apertures 200 formed in the central portion of the vertical connecting bars 170. The chain is then suitably shortened and trained about the repositioned sprocket wheels to provide a cut the upper half of which is square and the lower half of which is circular as illustrated at 202 in Figure 13.

In Figures 14 through 18, there is shown still another form of an auger mining section assembly, generally indicated at 210, which embodies the principles of the present invention. The assembly 210 includes a forward auger part 212 which preferably is constructed of a pair of spiral or helical blades 214 disposed out of phase with respect to each other approximately 180°. The inner edges of the blades 214 are rigidly secured to a hollow hub member 216, the rearward end of which is provided with a square interior cross-sectional configuration forming a shaft receiving socket 218. Rigidly secured to the forward edge of the two helical blades 214 is a cutting bar 220 having its forward edge suitably apertured to receive a plurality of cutting teeth 222.

Figure 14:
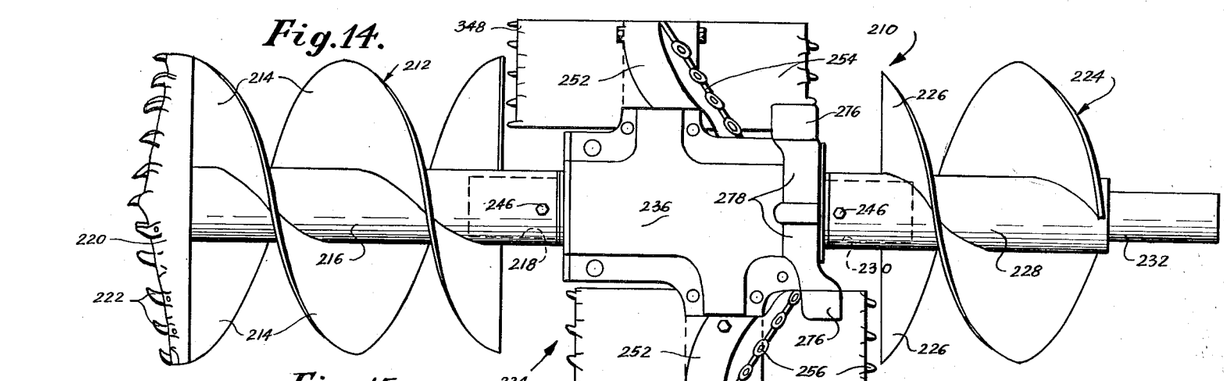
Figure 14 is a top plan view of still another form of auger mining section assembly embodying the principles of the present invention.
Figure 15:
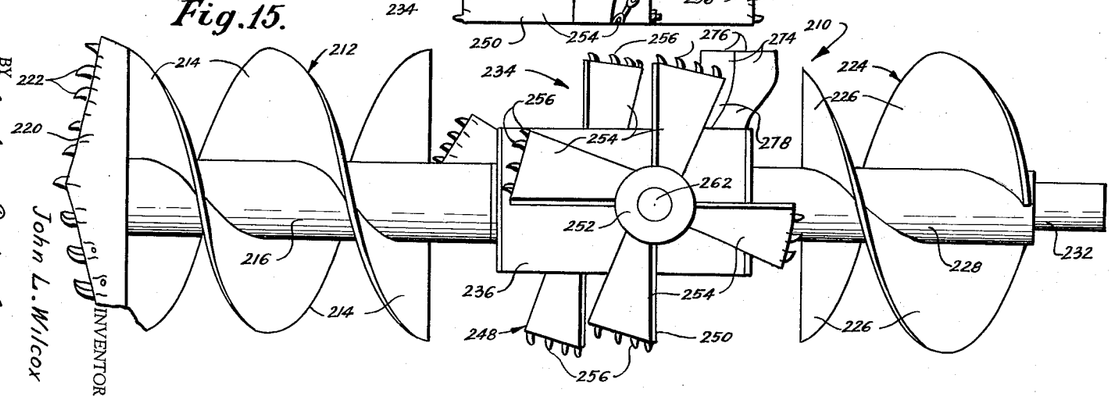
Figure 15 is a side elevational view of the assembly shown in Figure 14.

The assembly 210 also includes a rear auger part 224 which preferably is constructed of a pair of spiral or helical blades 226 disposed approximately 180° out of phase with respect to each other. As before, the inner edges of the blades are rigidly secured to a hollow hub member 228, the forward end of which is formed with a square interior cross-sectional configuration to provide a shaft receiving socket 230. The rearward end of the hollow hub member 228 has a stub shaft 232 of square cross-sectional configuration extending outwardly therefrom for connection with the forward end of a conventional auger mining section.

Figure 18:
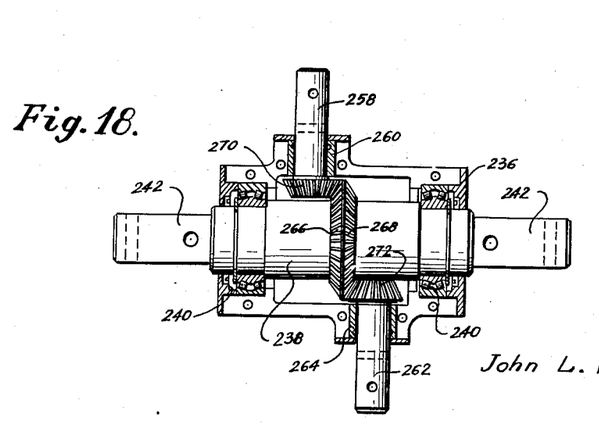
Figure 18 is a cross-sectional view taken along line 18—18 of Figure 17.

The assembly 210 also includes an auxiliary cutting unit generally indicated at 234. As best shown in Figure 18, the unit 234 includes a housing 236 which is preferably of a suitable two-piece bolted construction having a main shaft 238 journaled therein as by roller bearings 240 or the like. The shaft 238 extends outwardly from opposite ends of the housing 236 and the opposite ends of the shaft are formed with a square cross-sectional configuration, as indicated at 242, for engagement within the sockets 218 and 230 respectively of the forward and rearward auger parts. The shaft ends are fixed within the sockets by any suitable means, such as bolts 246 extending through suitable apertures formed in the shaft ends and registering apertures formed in the hub members of the respective auger parts.

Figure 16:
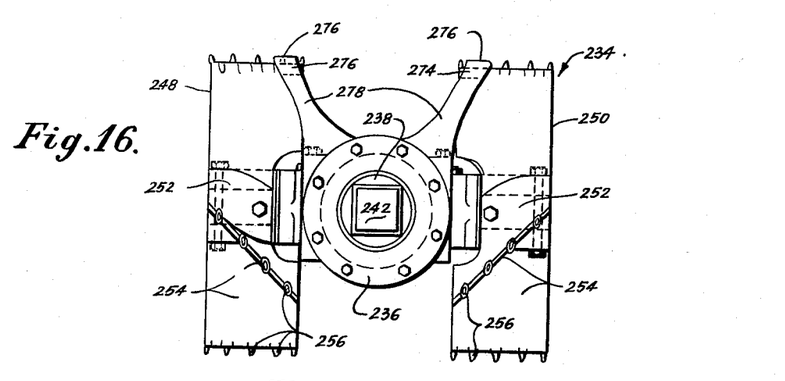
Figure 16 is a rear elevational view of the auxiliary cutting unit of the assembly shown in Figure 14.
Figure 17:
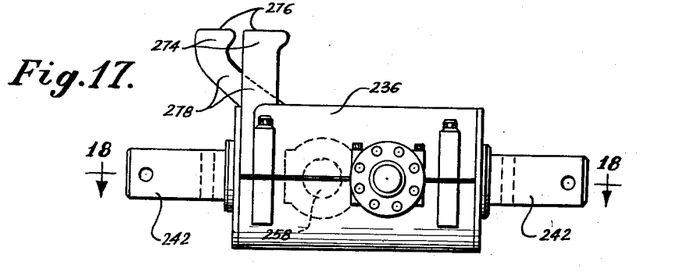
Figure 17 is a side elevational view of the unit shown in Figure 16 with the rotary blade cutter removed.

The auxiliary cutting unit 234 also includes a pair of rotary cutters 248 and 250 mounted on the housing for rotation about transversely extending axes disposed within a common transverse plane passing through the axis of the main shaft 238. Each of the rotary cutters includes a hollow hub member 252 having a plurality of circumferentially spaced helical blades 254 rigidly secured thereto at their inner ends. The outer ends of the blades 254 are provided with a plurality of cutting teeth 256.

The rotary cutter 248 is mounted on the housing by means of a shaft 258 suitably journaled in the housing as by a sleeve bearing 260 or the like. The shaft 258 extends outwardly from the housing and is suitably connected to the hub member 252 of the cutter 248 as by a set screw or the like. In a like manner, the rotary cutter 250 is mounted on the housing by means of a shaft 262 journaled in the housing, as by a sleeve bearing 264, in rearward longitudinally spaced relation to the shaft 258. The shaft 262 extends outwardly from the housing and is suitably fixed to the hub member 252 of the rotary cutter 250 by any suitable means, such as a set screw or the like.

As best shown in Figure 18, the rotary cutters 248 and 250 are drivingly connected with the shaft 238 by any suitable means, such as a pair of oppositely-facing spur gears 266 and 268 fixed to the central portion of the main shaft 238 and a pair of secondary spur gears 270 and 272 fixed to the inner ends of the shafts 258 and 262 respectively and disposed in meshing engagement with the spur gears 266 and 268 respectively.

In order to prevent rotation of the auxiliary cutting unit 234 with the auger parts 212 and 224 there is provided a stabilizing means preferably in the form of a pair of longitudinally extending stabilizing shoes 274. As best shown in Figure 16, the stabilizing shoes 274 are mounted in trailing relation to the rotary cutters 248 and 250 respectively and each includes an upper surface 276 disposed in longitudinal alignment with the upper periphery of the associated rotary cutter. The shoes 274 are maintained in position by any suitable means, such as arms 278 rigid with the shoes and with the housing 236.

As best shown in Figure 19, the auxiliary cutting unit 234 will form a cut in conjunction with the forward auger part 212 in a mine vein 14 which has a substantially square cross-sectional configuration, as indicated at 280. The conventional circular cross-sectional cut made by a conventional auger mining section is illustrated at 282 in Figure 19.

In the normal operation of all of the auger mining section assemblies described above, the assemblies are employed in the apparatus 10 as the first section to enter the mine vein. The rearward end of the rearward auger part of each assembly is arranged to be connected with the connection 26 of the apparatus illustrated at 10 in Figure 1. The forward cutting teeth embodied in each assembly provide a forward cutting means for the assembly during the advance thereof into the mine vein by the carriage 20 of the apparatus. The forward auger part serves to remove material from the mine vein within a cylindrical portion thereof so that the cut made thereby will be circular in cross-sectional configuration as indicated at 116, 198 and 282 in Figures 8, 13 and 19 respectively.

By employing an auger mining section assembly embodying the principles of the present invention, this cut can be increased approximately 40 to 50% with a corresponding increase in the yield obtained in the operation of the apparatus. This increase in yield is obtained as a result of the action of the auxiliary cutting units of the assemblies. In all of the embodiments disclosed, the auxiliary cutting unit is operable to square the normally round hole and thus remove material remaining in a rectangular prism within the mine vein having its axis coincident with the axis of the cylindrical portion previously removed and its dimensions substantially equal to the diameter of the cylindrical portion.

In all of the embodiments disclosed, it will be noted that the auxiliary cutting unit includes cutting means which is driven by the rotational movement of the forward and rearward auger parts. In all of the embodiments, stabilizing means is provided to prevent the auxiliary cutting unit from rotating with the auger parts. Thus, the housing of the auxiliary cutting unit is maintained in a stable position with respect to the rotation of the auger parts. The main shaft of the housing is rigidly connected between the auger parts and therefore rotates with respect to the housing. The rotary movement of the main shaft within the housing is utilized to drive the cutting means of the unit.

In the embodiment illustrated in Figures 2 through 8 it will be noted that the auger cutters on opposite sides of the housing are oppositely pitched and rotated in a direction which will cause the material engaged to be fed inwardly of the assembly. In this manner, the material cut by the auxiliary cutting unit is moved toward the central portion of the assembly where it can be readily conveyed or moved by the rearward auger part 54 and subsequent conventional auger sections. In this way, substantially all of the additional material cut by the auxiliary cutting unit will be removed from the mine vein and conveyed to the truck during the operation.

In areas where the material removed from the vein is difficult to handle, the lower pair of the auger cutters can be removed from the unit. This leaves the lower half of the cut made by the assembly semi-cylindrical in form as illustrated at 120 in Figure 8. In this way, material in the upper half of the cut will fall by gravity into the lower half and be conveyed out of the mine vein by the rearward auger part and subsequent auger sections.

The assembly 210 illustrated in Figures 14–18, also provides rotary cutters which have blades oppositely pitched to feed the material cut thereby inwardly of the assembly. The rotation of the cutters of the assembly 210 is such as to materially assist in moving the material onto the rearward auger part.

By utilizing the assembly of the present invention as the forward section in conjunction with a mining apparatus, such as the apparatus 10 illustrated in Figure 1, an increase of approximately 40 to 50% in the yield over that obtained by conventional auger mining sections can be obtained. This increase is obtained without the necessity of increasing the spacing between adjacent cuts in the mine vein. In the normal operation of an apparatus of the type illustrated at 10 a column of material is maintained between each cut which serves to hold the vein against collapse. The strength of such column is necessarily limited by its minimum thickness. The present invention does not reduce the minimum thickness of such columns but serves to remove the material from the vein so that supporting columns are of substantially uniform minimum thickness throughout. In this way substantially the same supporting strength is provided and the yield is increased approximately 40 to 50%.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. For use with a mining apparatus of the type including a frame, a carriage mounted on said frame, for movement between extended and retracted positions, means on said carriage for detachably connecting an auger drilling section to a source of rotative power, means for moving said carriage on said frame from said retracted position to said extended position to advance an auger drilling section connected to said connecting means longitudinally into a mine vein and for moving said carriage from said extended position to said retracted position with the auger drilling section detached from said connecting means so that an additional auger drilling section can be connected in longitudinal alignment between the first mentioned section and said connecting means to be longitudinally advanced with the first mentioned section into the mine vein upon subsequent movement of said carriage from its retracted position to its extended position, an improved auger drilling section assembly comprising forward and rearward auger drilling parts rigidly mounted in longitudinally spaced and longitudinally aligned relation for rotation together, means on the rear end of said rearward auger drilling part for detachably connecting the same to the connecting means of said apparatus to be advanced into the mine vein by the movement of the carriage thereof from said retracted position to said extended position, the shape of said auger parts being such as to remove material from the mine vein during advance therein which is disposed in a cylindrical portion thereof, driven cutting means mounted on said parts between the latter in driving relation thereto for cutting at least one half of the material in the mine vein remaining in a rectangular prism having its axis coincident with the axis of said cylindrical portion and dimensions substantially equal to the diameter thereof.

2. An assembly as defined in claim 1 wherein said cutting means comprises a pair of opposed auger cutters mounted for rotation about a common transverse horizontal axis spaced vertically from the axis of rotation of said auger parts.

3. An assembly as defined in claim 2 wherein said cutting means further includes a second pair of opposed auger cutters mounted for rotation about a common transverse horizontal axis spaced vertically from the axis of rotation of said auger parts a distance equal to and in a direction opposite from the vertical spacing of the common axis of said first mentioned pair of cutters.

4. An assembly as defined in claim 2 wherein said pair of auger cutters are oppositely pitched to move the material inwardly toward each other.

5. An assembly as defined in claim 1 wherein said cutting means comprises an endless chain trained about two vertically spaced pairs of horizontally spaced sprocket wheels and having a plurality of cutting teeth mounted thereon.

6. An assembly as defined in claim 1 wherein said cutting means comprises a rotary cutter mounted for rotation about a horizontal transverse axis.

7. An assembly as defined in claim 6 wherein said cutting means further includes a second rotary cutter mounted in opposed relation to said first mentioned cutter for rotation about a horizontal transverse axis spaced horizontally from the axis of said first mentioned cutter.

8. An assembly as defined in claim 6 wherein said rotary cutter includes a plurality of circumferentially spaced, generally helical blades having teeth on their outer ends.

9. A mine drilling section assembly of the type described comprising a housing, a shaft journaled in said housing, forward and rearward rotary auger parts rigid the opposite ends of said shaft respectively, said auger parts being shaped to remove during operation material from a mine vein within a cylindrical portion thereof, stabilizing means rigid with said housing extending outwardly beyond the periphery of said auger parts, driven cutting means carried by said housing in advance of and in longitudinal alignment with said stabilizing means for cutting at least the upper half of the material in the mine vein engaged thereby during operation which remains in a rectangular prism having its axis coincident with the axis of said cylindrical portion and dimensions substantially equal to the diameter thereof, means in said housing drivingly connecting said cutting means with said shaft, and means on the rear end of said rearward auger part for connection with a source of rotative power.

10. An assembly as defined in claim 9 wherein said stabilizing means comprises a pair of longitudinally extending shoes equally spaced in horizontal alignment on opposite sides of and above the axis of rotation of said shaft.

11. An assembly as defined in claim 9 wherein said cutting means includes a pair of auger cutters carried by said housing for rotation about a common transverse horizontal axis spaced above the axis of rotation of said shaft.

12. An assembly as defined in claim 11 wherein said means for drivingly connecting said cutter means to said shaft comprises a first gear fixed to the central portion of said shaft and a second gear in meshing engagement with said first gear and rigid with both of said auger cutters.

13. An assembly as defined in claim 11 wherein said cutter means further includes a second pair of auger cutters carried by said housing for rotation about a common transverse horizontal axis spaced below the axis of rotation of said shaft.

14. An assembly as defined in claim 9 wherein said cutter means comprises a first pair of sprocket wheels carried by said housing for rotation about parallel longitudinally extending axes disposed in a common horizontal plane above the axis of said shaft, a second pair of sprocket wheels carried by said housing for rotation about axes parallel to the axes of said first sprocket wheels and disposed in a common horizontal plane therebelow, an endless chain trained about all of said sprocket wheels, and cutting teeth carried by said chain.

15. An assembly as defined in claim 14 wherein the axes of said second pair of sprocket wheels are disposed in a common plane disposed below the axis of the shaft a distance substantially equal to the distance between the axis of said shaft and the common plane of the axes of said first pair of sprocket wheels.

16. An assembly as defined in claim 14 wherein said means for drivingly connecting said cutter means to said shaft comprises an auxiliary shaft journaled in said housing for rotation about a longitudinal axis spaced below the axis of said first mentioned shaft, a fifth sprocket wheel fixed to said auxiliary shaft and engaging said chain, and means drivingly connecting said shafts.

17. An assembly as defined in claim 9 wherein said cutter means comprises a rotary cutter carried by said housing for rotation about a transverse axis intersecting the axis of said shaft, said rotary cutter including circumferentially spaced helical blades having cutting teeth on their outer ends.

18. An assembly as defined in claim 9 wherein said cutter means includes a pair of rotary cutters carried by said housing for rotation about transverse axes disposed on opposite sides of said shafts in a common transverse plane passing through the axis of said shaft.

19. An assembly as defined in claim 18 wherein said means for drivingly connecting said cutter means and said shaft comprises a pair of oppositely facing spur gears fixed to said shaft and a spur gear fixed to each rotary cutter in meshing engagement to one of said pair of spur gears.

20. An assembly as defined in claim 18 wherein each of said rotary cutters includes circumferentially spaced helical blades having cutting teeth on their outer ends.

References Cited in the file of this patent

UNITED STATES PATENTS

| | | |
|---|---|---|
| 740,906 | Owen | Oct. 6, 1903 |
| 2,324,956 | Sewell | July 20, 1943 |
| 2,825,544 | Ahlson | Mar. 4, 1958 |